(12) United States Patent
Soga et al.

(10) Patent No.: US 11,061,143 B2
(45) Date of Patent: Jul. 13, 2021

(54) GLOBAL NAVIGATION SATELLITE SYSTEM, NAVIGATION TERMINAL, NAVIGATION METHOD AND PROGRAM

(71) Applicant: NEC Corporation, Tokyo (JP)

(72) Inventors: Hiroshi Soga, Tokyo (JP); Yoshimi Ohshima, Tokyo (JP); Tomoya Osawa, Kanagawa (JP); Aki Taniyama, Kanagawa (JP); Aki Sakamoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 16/087,218

(22) PCT Filed: Mar. 17, 2017

(86) PCT No.: PCT/JP2017/010912
§ 371 (c)(1),
(2) Date: Sep. 21, 2018

(87) PCT Pub. No.: WO2017/164118
PCT Pub. Date: Sep. 28, 2017

(65) Prior Publication Data
US 2019/0101653 A1  Apr. 4, 2019

(30) Foreign Application Priority Data
Mar. 24, 2016  (JP) .............. JP2016-059554

(51) Int. Cl.
*G01S 19/25* (2010.01)
*G01S 19/23* (2010.01)
(Continued)

(52) U.S. Cl.
CPC ............ *G01S 19/256* (2013.01); *G01C 21/28* (2013.01); *G01S 19/23* (2013.01); *G01S 19/28* (2013.01)

(58) Field of Classification Search
CPC ........ G01S 19/256; G01S 19/28; G01S 19/23; G01C 21/28
See application file for complete search history.

(56) References Cited

U.S. PATENT DOCUMENTS

| 5,623,414 A | 4/1997 | Misra |
| 8,188,913 B2 * | 5/2012 | Henkel .................. G01S 19/44 342/357.4 |

(Continued)

FOREIGN PATENT DOCUMENTS

| JP | 2001-133536 A | 5/2001 |
| JP | 2007-183127 A | 7/2007 |

(Continued)

OTHER PUBLICATIONS

International Search Report for PCT Application No. PCT/JP2017/010912, dated Jun. 20, 2018.

(Continued)

*Primary Examiner* — Thomas Ingram
(74) *Attorney, Agent, or Firm* — Sughrue Mion, PLLC

(57) ABSTRACT

In a satellite navigation system a navigation terminal continuously receives navigation signals from navigation satellites and continuously implements navigation calculations, thereby obtaining navigation calculation results, and executes in parallel: using clock offset values determined through the navigation calculations, calculates, in real time, changes in difference between time differences with regard to difference between time differences, which are differences between a clock offset value and a standard deviation value, which is the value of the standard deviation of fluctuation amounts of the clock offset values; determines, in real time, two navigation precision indices of the calculated navigation calculation results on the basis of each change in the calculated difference between time differences and standard deviation value; associates, in real time, the determined two (Continued)

navigation precision indices with the calculated navigation calculation results; and outputs, in real time, the navigation calculation results associated with the at least two navigation precision indices.

20 Claims, 6 Drawing Sheets

(51) Int. Cl.
*G01S 19/28* (2010.01)
*G01C 21/28* (2006.01)

(56) References Cited

U.S. PATENT DOCUMENTS

| | | | |
|---|---|---|---|
| 8,510,044 B2* | 8/2013 | Watanabe | G01S 19/47 |
| | | | 701/472 |
| 8,525,727 B2* | 9/2013 | Roh | G01S 19/22 |
| | | | 342/357.77 |
| 2008/0252528 A1 | 10/2008 | Shen et al. | |
| 2009/0303112 A1 | 12/2009 | Alizadeh-Shabdiz | |
| 2009/0309790 A1 | 12/2009 | Farmer et al. | |
| 2011/0018763 A1* | 1/2011 | Watanabe | G01S 19/23 |
| | | | 342/357.62 |
| 2012/0259543 A1 | 10/2012 | Shirai | |
| 2012/0268323 A1* | 10/2012 | Farmer | G01S 19/05 |
| | | | 342/357.69 |
| 2014/0107890 A1 | 4/2014 | Funabashi | |
| 2017/0038475 A1 | 2/2017 | Soga et al. | |

FOREIGN PATENT DOCUMENTS

| | | |
|---|---|---|
| JP | 2008-157705 A | 7/2008 |
| JP | 2008-261799 A | 10/2008 |
| JP | 2011-013189 A | 1/2011 |
| JP | 2011-523062 A | 8/2011 |
| JP | 2011-524524 A | 9/2011 |
| JP | 2011-211336 A | 10/2011 |
| JP | 2012-220371 A | 11/2012 |
| JP | 2014-078171 A | 5/2014 |
| WO | 2015/099194 A1 | 7/2015 |

OTHER PUBLICATIONS

English translation of Written opinion for PCT Application No. PCT/JP2017/010912.

* cited by examiner

GLOBAL NAVIGATION SATELLITE SYSTEM, NAVIGATION TERMINAL, NAVIGATION METHOD AND PROGRAM

This application is a National Stage Entry of PCT/JP2017/010912 filed on Mar. 17, 2017, which claims priority from Japanese Patent Application 2016-059554 filed on Mar. 24, 2016, the contents of all of which are incorporated herein by reference, in their entirety.

TECHNICAL FIELD

This invention relates to a global navigation satellite system, a positioning terminal, a positioning method, and a program.

BACKGROUND ART

In recent years, positioning information using a global navigation satellite system has been used for various purposes.

In a global positioning system (GPS), which is a typical global navigation satellite system, the GPS are using a plurality of GPS signal waves transmitted from a plurality of GPS satellites (NAVSTAR satellites) for measurement position coordinates of a GPS receiver (positioning terminal).

Owing to various kinds of research and development, positioning methods using GPS signals enable a current position (position of the positioning terminal) to be measurement by a single device substantially in real time with accuracy on the order of approximately 10 m.

Various methods of enhancing positioning accuracy and various methods of shortening positioning time have been investigated, and a positioning method using a precise ephemeris and a positioning method of causing a plurality of devices to cooperate with each other are often used.

For example, a precise ephemeris based on estimation is to be broadcast in the future to positioning terminals (including an automobile, a cell phone, a GPS device, a vessel, agricultural machinery, mining machinery, and a drone) as an augmentation signal (correction information) using a quasi-zenith satellite or a geostationary satellite. This enables various positioning terminals to perform highly-accurate positioning, and hence better service can be expected.

In order to achieve precise positioning, researchers from different fields have been attempting to cancel (reduce) various error factors (including an ionospheric propagation delay, a tropospheric propagation delay, an ambiguity, and a multipath) individually.

Even at present, many researchers are seeking for various methods for performing precise positioning by one or more positioning terminals. Many researchers are also seeking to achieve a positioning method with higher accuracy in combination with, for example, another communication technology or a sensor.

Examples of technologies relating to global navigation satellite systems are described in Patent Documents 1 to 4.

In Patent Document 1, there is disclosed a GPS positioning system configured to perform highly-accurate positioning using a final ephemeris (precise ephemeris) managed by the International GNSS Service (IGS). In addition, a rapid ephemeris and a final ephemeris are described.

In Patent Document 2, there is disclosed an invention for achieving reduction in a time to be taken until a higher single positioning accuracy is obtained by causing ambiguities or other such error components to converge through continuous observation by the positioning terminal.

In Patent Document 3, there is disclosed an on-vehicle navigation system involving: comparing a clock offset value exhibited at a current epoch in a positioning computation process with a clock offset average value (clock offset reference value) being the average of clock offset values obtained at past epochs; and using the magnitude of the absolute value of a difference therebetween as an accuracy index of a positioning computation result.

In Patent Document 4, for a similar on-vehicle navigation system, there is described a method of subjecting a GPS positioning solution obtained from a given combination of GPS satellites to re-positioning-computation with a new combination of the GPS satellites when the positioning accuracy is low with reference to an accuracy index using a time offset value output as a positioning solution.

PRIOR ART DOCUMENT(S)

Patent Document(s)

Patent Document 1: JP 2001-133536 A
Patent Document 2: JP 2014-078171 A
Patent Document 3: JP 2008-157705 A
Patent Document 4: JP 2007-183127 A

SUMMARY OF THE INVENTION

Problem to be Solved by the Invention

In a global navigation satellite system, there is a demand to know a degree of reliability of a positioning computation result (pinpointed position).

For example, a user who uses a terminal configured to display a current position on a map to examine the current position wishes to know to what degree of reliability the positioning computation result has. Some of the currently available positioning terminals include a mechanism for displaying a candidate range before coordinate values converge in the positioning computation during continuous positioning computation processing. Meanwhile, the positioning computation result obtained after the values converge in the positioning computation is currently handled as a true positioning result. However, when the degree of reliability of the positioning computation result can be determined as an accuracy index by some approach, the accuracy index can be used as useful information.

Also in the case of a machine using the positioning result, useful information processing can be performed when it can be identified to what degree of reliability the positioning computation result has. For example, in terms of supporting automatic driving, when a degree of reliability of the positioning accuracy of positional information on another vehicle, which is notified of by the another vehicle, can be identified by the accuracy index indicating the degree of reliability, it is possible to perform traveling control so as to maintain a following distance in consideration of the positioning accuracy.

In view of the foregoing, the inventors have investigated a mechanism for discriminating a degree of reliability of the positioning accuracy of the positioning computation result from navigation signals. In particular, the inventors have investigated an accuracy index indicating a degree of reliability of a positioning computation result having satisfactory accuracy in Precise Point Positioning.

Against this backdrop, this invention provides a global navigation satellite system, a positioning terminal, a positioning method, and a program, which involve associating a degree of reliability of a positioning computation result based on navigation signals with the positioning computation result in real time.

Means to Solve the Problem

According to one embodiment of this invention, there is provided a global navigation satellite system, comprising a navigation satellite group of navigation satellites each configured to broadcast a navigation signal for GNSS; and a positioning terminal configured to perform positioning, wherein the positioning terminal is configured to perform processing in parallel while continuously receiving the respective navigation signals from the navigation satellite group and continuously performing positioning computation to obtain a positioning computation result, the processing including using a clock offset value group obtained by the positioning computation to calculate in real time a standard deviation value, which is a value of a standard deviation of a jitter amount of the clock offset value group, and a change amount of a difference between time differences being a difference between clock offset values; determining in real time two positioning accuracy indices of the positioning computation result determined through calculation based on respective values of the standard deviation value and the change amount of the difference between time differences that have been calculated; associating in real time the determined two positioning accuracy indices with the positioning computation result determined through calculation; and outputting in real time the positioning computation result associated with at least the two positioning accuracy indices.

According to one embodiment of this invention, there is provided a positioning terminal, comprising a positioning module, wherein the positioning module is configured to execute processing in parallel while continuously acquiring respective navigation signals from a navigation satellite group of navigation satellites each configured to broadcast a navigation signal for GNSS and continuously performing positioning computation in real time to obtain a positioning computation result, the processing including using a clock offset value group obtained by the positioning computation to calculate a standard deviation value, which is a value of a standard deviation of a jitter amount of the clock offset value group, and a change amount of a difference between time differences being a difference between clock offset values; determining two positioning accuracy indices of the positioning computation result determined through calculation based on respective values of the standard deviation value and the change amount of the difference between time differences that have been calculated; and associating the determined two positioning accuracy indices with the positioning computation result determined through calculation.

According to one embodiment of this invention, there is provided a positioning method, which is to be performed by a positioning terminal of a global navigation satellite system, the positioning method comprising executing, by the positioning terminal, processing in parallel while continuously acquiring respective navigation signals from a navigation satellite group of navigation satellites each configured to broadcast a navigation signal for GNSS and continuously performing positioning computation in real time to obtain a positioning computation result, the processing including using a clock offset value group obtained by the positioning computation to calculate a standard deviation value, which is a value of a standard deviation of a jitter amount of the clock offset value group, and a change amount of a difference between time differences being a difference between clock offset values; determining two positioning accuracy indices of the positioning computation result determined through calculation based on respective values of the standard deviation value and the change amount of the difference between time differences that have been calculated; associating the determined two positioning accuracy indices with the positioning computation result determined through calculation; and outputting in real time the positioning computation result associated with at least the two positioning accuracy indices.

According to one embodiment of this invention, there is provided a program for positioning, for causing a positioning terminal to be operated to execute processing in parallel while continuously acquiring respective navigation signals from a navigation satellite group of navigation satellites each configured to broadcast a navigation signal for GNSS and continuously performing positioning computation in real time to obtain a positioning computation result, the processing including using a clock offset value group obtained by the positioning computation to calculate a standard deviation value, which is a value of a standard deviation of a jitter amount of the clock offset value group, and a change amount of a difference between time differences being a difference between clock offset values; discriminating two positioning accuracy indices of the positioning computation result determined through calculation based on respective values of the standard deviation value and the change amount of the difference between time differences that have been calculated; associating the determined two positioning accuracy indices with the positioning computation result determined through calculation; and outputting in real time the positioning computation result associated with at least the two positioning accuracy indices.

Effect of the Invention

According to one embodiment of this invention, it is possible to provide a global navigation satellite system, a positioning terminal, a positioning method, and a program, which involve associating a degree of reliability of a positioning computation result based on navigation signals with the positioning computation result in real time.

MODE FOR EMBODYING THE INVENTION

An embodiment of this invention is described with reference to the accompanying drawings.

In the following description, a Precise Point Positioning scheme using a carrier-phase is used as a positioning scheme based on navigation signals. The description is also given by using a clock offset value, which is one of unknown variables of the positioning computation, as time information to be used when an index of positioning accuracy is derived. There are no limitations imposed on the positioning scheme, and it is possible to employ any positioning scheme (e.g., single positioning scheme using a pseudorange) as long as the positioning scheme is a single positioning scheme.

The description is also given on the assumption that another satisfactory correction method (correction signal, precise ephemeris, dual frequency observation, or other such method) to be used for highly-accurate positioning is appropriately performed together. An index (accuracy index) indicating a degree of reliability of the positioning accuracy, which is described later, may also be effectively used by being notified to another device as required in accordance with use for the own device. In this case, position coordinate information, the time information, and the accuracy index may be output in association with one another as a positioning computation result obtained at each epoch by the own terminal.

Figure 1:
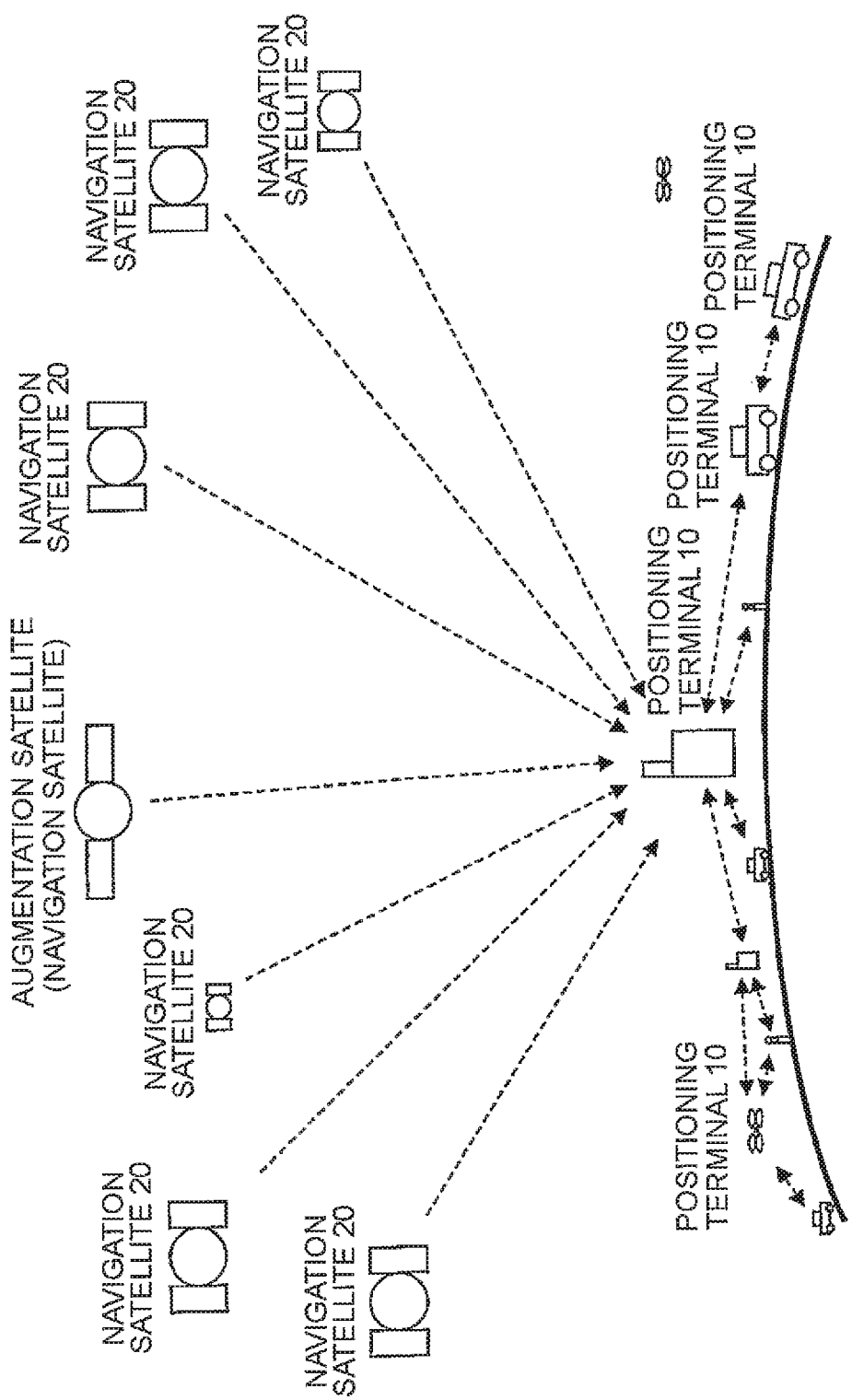
FIG. 1 is a configuration diagram for illustrating a global navigation satellite system according to an embodiment of this invention.
Figure 2:
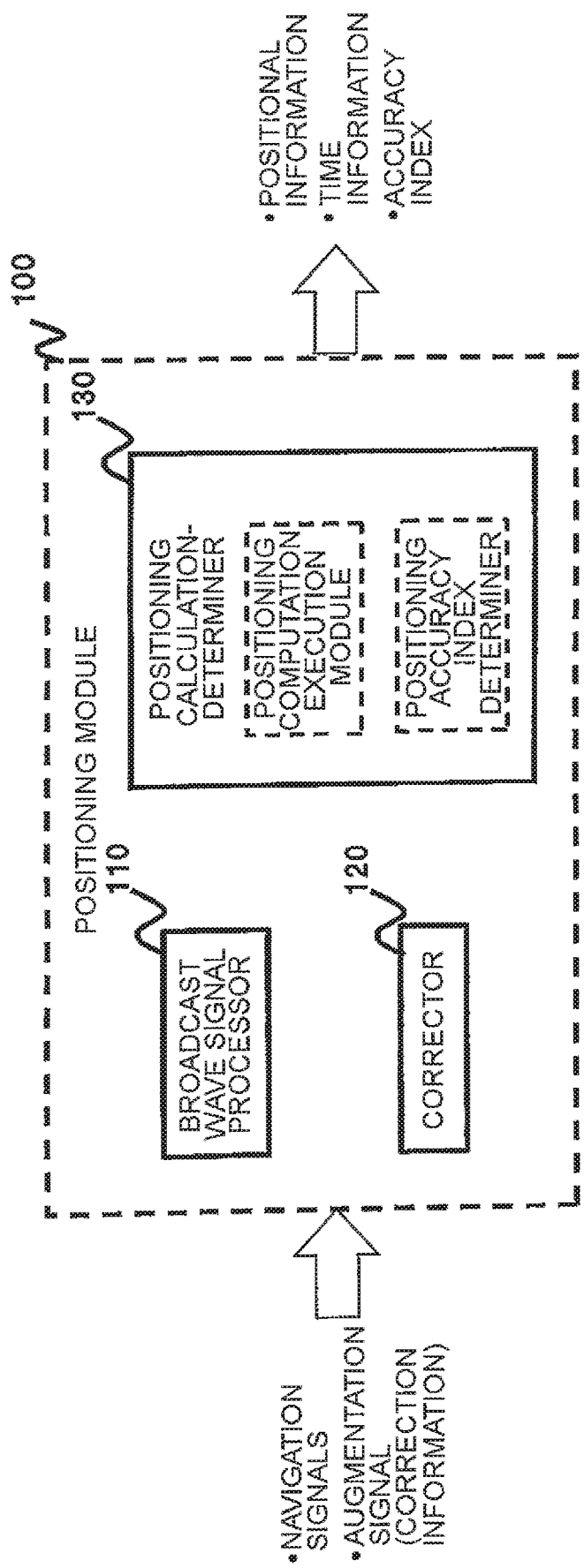
FIG. 2 is a block diagram for illustrating a part of a positioning terminal according to the embodiment.

FIG. 1 is a configuration diagram for illustrating a global navigation satellite system according to the embodiment. FIG. 2 is a configuration diagram for illustrating a part of a positioning terminal according to the embodiment.

The global navigation satellite system includes a positioning terminal 10 including a positioning module 100 and a plurality of navigation satellites 20 each configured to broadcast a navigation signal for GNSS. As illustrated in FIG. 2, the positioning module 100 in this embodiment includes a broadcast wave signal processor 110, a corrector 120, and a positioning calculation-determiner 130. The positioning terminal 10 includes not only the positioning module 100 illustrated in FIG. 2 but also an antenna, an input/output module, and a processor configured to operate, for example, application software. The positioning terminal 10 is also desired to enhance its positioning accuracy by acquiring required information from, for example, an augmentation satellite configured to provide a precise ephemeris or correction information as an augmentation signal or a communication network (mobile communication, wireless LAN (local area network), or other such communication). The positioning terminal 10 is capable of obtaining, for example, error information indicating an ionospheric propagation delay or a tropospheric propagation delay exhibited in a positioning region from the augmentation signal or an information source in the periphery. In addition, the positioning terminal 10 may appropriately use the correction information included in the augmentation signal in accordance with a purpose.

The individual navigation satellites 20 broadcast navigation signals having a plurality of each frequency. A generally used GPS satellite or other such satellite can be used as the navigation satellite 20. The augmentation satellite or a satellite for another global navigation satellite system may be included in the navigation satellites 20.

The positioning terminal 10 receives the respective navigation signals from the respective navigation satellites 20 for positioning. In positioning processing, four or more navigation signals are generally used to calculate the position coordinate information and the time information at each epoch.

In addition, in many positioning schemes, for higher accuracy, the augmentation signal is appropriately received from the augmentation satellite or other such satellite by the positioning terminal 10, and information including orbits and clocks of a navigation satellite group to be used is acquired from a precise ephemeris included in the augmentation signal, and is used for the positioning computation.

The positioning terminal 10 may also receive the respective dual/triple-frequency broadcast waves from all the navigation satellites 20 to be used to attempt to eliminate an ionospheric propagation delay component without using the correction information (ionospheric correction information) of the received augmentation signal.

A general positioning terminal is capable of performing positioning (single positioning) based on a pseudorange through use of only one-frequency navigation signals received from different satellites for positioning. It is also possible to perform positioning (single precise positioning) based on a carrier-phase. Meanwhile, the positioning performed through use of only navigation signals has a problem that the accuracy is rough and a problem that long ranging time is required.

In addition, many positioning terminals perform continuous observation for repeating positioning computation processing at each epoch. Through the continuous observation, for example, a current position on a map can be moved, and an improvement in positioning accuracy is achieved.

In the positioning computation performed by the positioning module 100, position coordinates (x, y, z) of the positioning terminal 10 and a time difference ($\Delta t$; clock offset) are used as unknowns to output positional information and time information based on the navigation signals broadcast from the plurality of navigation satellites 20. The time information contains a slight difference from a system time of the navigation satellite 20 due to various factors. The system time of the navigation satellite 20 is highly accurate compared with time ticked by the positioning terminal 10, but contains an error due to various factors in the process of obtaining the system time by the positioning terminal 10. This slight difference adversely affects the accuracy of a positioning result of a positioning computation. The time difference between the system time of the navigation satellite 20 and the time of the positioning terminal 10 is referred to as "clock offset". The clock offset drifts due to temperature characteristics of a clock oscillator and other such various factors.

In view of this, in order to improve the positioning accuracy based on a plurality of navigation signals received by the broadcast wave signal processor 110, the positioning terminal 10 causes the corrector 120 to correct respective values to be used for the positioning processing through use of the correction information or the precise ephemeris. After that, the positioning terminal 10 performs the positioning computation processing at each epoch through use of the respective values corrected by the positioning calculation-determiner 130.

Also in this method, the positioning terminal 10 causes the positioning calculation-determiner 130 to continuously perform the positioning computation based on the plurality of navigation signals, and in the process of obtaining the positioning computation result at each epoch, derive the accuracy index of the positioning computation result in real time in parallel with the positioning computation processing to associate the accuracy index with the positioning computation result.

Now, three accuracy indices are described. The first index is a value of a magnitude of jitter in continuity of clock offset value. The second index is a value of a stability of a jitter amount in continuity of the clock offset value. The third index is a magnitude value of a change in a difference between time differences exhibited in the continuity of the clock offset value.

The magnitude of the jitter in continuity of the clock offset value, which is the first index, can be determined through use of a deviation amount (magnitude) of a time difference (clock offset value; ($\Delta t$)) at the most recent epoch with respect to an average of time differences (clock offset values; ($\Delta t$)) at respective epochs determined through calculation in the past. As the deviation amount becomes larger, it becomes more highly possible that the positioning computation result determined through calculation has positioning accuracy that is "not reliable".

The second index and the third index are determined through calculation through use of a receiver clock drift value, which is a difference in clock offset value (difference between time differences) between the immediately preceding epoch and the most recent epoch. When the receiver clock drift value is small, the positioning computation result determined through calculation maintains the positioning accuracy equivalent to that of the immediately preceding positioning computation result.

The stability of the jitter amount in continuity of the clock offset value, which is the second index, may be obtained by calculating a standard deviation value through use of clock offset values exhibited at respective epochs within a predetermined period. For example, the standard deviation value of time differences (clock offset values, ($\Delta t$)) at the respective epochs for 60 seconds including the current epoch may be set as a basis of the accuracy index to be associated with the positioning result at the current epoch. In addition, for example, together with the standard deviation value of the time differences at the respective epochs for 60 seconds including the current epoch, an average of the clock offset values including the clock offset value exhibited at the current epoch during that period may be calculated simultaneously to be used for calculation of a stability index. The stability may also be determined through use of a duration (number of epochs that continue after stability is achieved) during which the magnitude of the jitter is maintained within a predetermined range.

The magnitude value of the change in difference between time differences exhibited in the continuity of the clock offset value, which is the third index, can be determined through use of a value of a difference between the receiver clock drift value exhibited at the most recent epoch and an average receiver clock drift value. As the average receiver clock drift value, it is desired to use an average of receiver clock drift values obtained at predetermined past epochs that do not include the current epoch.

When the receiver clock drift value is unsatisfactory in regard to the clock offset value exhibited at the immediately preceding epoch, it is desired to determine through calculation an estimation value of the immediately preceding clock offset value from the clock offset values exhibited at past several epochs before the receiver clock drift value exhibited at the most recent epoch is obtained, and to determine through calculation the receiver clock drift value between the estimation value of the clock offset value expected to have been exhibited at the immediately preceding epoch and the clock offset value exhibited at the most recent epoch. This enables an effect on the accuracy index for the most recent epoch, which is exerted on the immediately preceding epoch, to be calibrated by estimation computation processing for the clock offset value expected to have been exhibited at the immediately preceding epoch. This can prevent an adverse effect on the immediately preceding epoch from being exerted on a future epoch when, for example, the clock offset value exhibited at the immediately preceding epoch protrudes in a spike form.

In the case of adding the estimation computation processing for the clock offset value expected to have been exhibited at the immediately preceding epoch, for example, the positioning terminal may operate as follows. That is, in order to determine the index of positioning accuracy at the current epoch through calculation, the positioning terminal excludes the clock offset value that does not fall within a threshold value range of a jitter change amount from the clock offset values exhibited at a predetermined number of last epochs, estimates and adds a clock offset value expected to have been exhibited at the epoch for the excluded clock offset value based on the clock offset values obtained at neighboring epochs, and then calculates the standard deviation value of the clock offset values.

As the stability becomes lower, it becomes more highly possible that the positioning computation result determined through calculation has positioning accuracy that is not reliable. Meanwhile, when the stability is high, it is understood that the positioning computation result determined through calculation has been obtained under an environment in which a change amount of a drift value of the clock offset value is stable.

While those three accuracy indices are determined in real time, the determined positioning accuracy indices are associated in real time with the positioning computation result determined through calculation.

In this manner, the positioning terminal 10 determines the indices of positioning accuracy of the positioning computation result determined through calculation based on jitter exhibited in the continuity of time, and assigns the indices to data at the epoch (most recent epoch).

This association allows the positioning terminal 10 to obtain the indices indicating the degrees of reliability of the positioning accuracy along with the positioning computation result in real time.

In regard to the second index and the third index described above, it suffices that only one thereof is associated with the positioning computation result determined through calculation, but it is desired to associate both thereof with the positioning computation result determined through calculation. In this case, when the change amount of the difference between time differences of the most recent clock offset value falls within a predetermined range with the jitter amount of the past and most recent clock offset values being stable, it is possible to assign the index indicating "having an extremely high degree of reliability".

The jitter of the clock offset value has a high correlation with the positioning accuracy. The change amount of the difference between time differences of the clock offset value has a higher correlation with the positioning accuracy. Therefore, while high positioning accuracy is maintained, both the jitter amount of the clock offset value and the change amount of the difference between time differences are small. In other words, it is understood that the likelihood that the positioning accuracy is high when the jitter of the clock offset value is small. In the same manner, it is understood that the likelihood that the positioning accuracy is high when the change amount of the difference between time differences of the clock offset value is small.

The stability of the jitter amount of the clock offset value also relates to how a change amount of a drift value of a time difference fluctuation changes from epoch to epoch. In addition, the stability has a high correlation with a stability of a positioning environment. For example, when minute fluctuations occur in one of diverse error factors (multipath and noise including voltage fluctuations), an effect thereof occurs in the change amount of the drift value from a new epoch, and as a result, the magnitude of the change amount of the drift value reacts thereto, which leads to a loss of stability. When the positioning accuracy deteriorates, the stability of the jitter amount of the clock offset value is lost.

Therefore, while the positioning environment is maintained with high positioning accuracy, the jitter amount of the clock offset value is stable. In other words, it is understood that the likelihood that the positioning environment and the positioning accuracy are maintained is high when the jitter amount of the clock offset value is stable.

In other words, it is understood that the likelihood that the positioning computation result to which the above-mentioned accuracy indices are assigned is stable as well as the positioning environment is high and the likelihood that true position coordinates are indicated is higher when the jitter amount of the clock offset value is stable.

The standard deviation value of the receiver clock drift values is used as the stability index, and a value obtained by subtracting an average value of the receiver clock drift values from the receiver clock drift value is assumed as an index of a magnitude. In addition, a value obtained by multiplying each of those values by the speed of light is assumed to be highly convenient. That is, a value (unit: distance (m)) obtained by multiplying each value by the speed of light (3×10^8 (m/s)) can be used as any one of the positioning accuracy indices to be assigned to the positioning computation result. The unit of the distance may be, for example, (mm) instead of (m).

When the jitter in the continuity of the clock offset value, which is the first index, is large, information indicating that the possibility that "the degree of reliability is low" is high may be simply assigned as the accuracy index together. In contrast, when the jitter in the continuity of the clock offset value is small, information indicating that the possibility that "the degree of reliability is high" is high may be simply assigned as the accuracy index together.

When the stability of the jitter amount in continuity of the clock offset value, which is the second index, is low, the information indicating that the possibility that "the degree of reliability is low" is high may be simply assigned as the accuracy index irrespective of the value of the third index. In contrast, when the stability of the jitter amount in continuity of the clock offset value is high, in a case where the duration is long, it is desired to assign the information indicating that the possibility that "the degree of reliability is high" is high as the accuracy index while referring to the value of the third index.

Also when one of the second index and the third index exhibits an unsatisfactory value, the information indicating that the possibility that "the degree of reliability is low" is high may be simply assigned as the accuracy index. In contrast, when both the change amount of the difference between time differences of the clock offset value and the stability of the jitter amount in continuity of the clock offset value exhibit satisfactory values, the information indicating that the possibility that "the degree of reliability is high" is high may be simply assigned as the accuracy index.

With this method, it is possible to represent the accuracy index by assigning one bit indicating whether the accuracy is satisfactory or unsatisfactory. In another case, for example, depending on the change amount of the difference between time differences or the stability, the accuracy index may be assigned through use of such a multi-step index as to represent information indicating that the possibility that "the degree of reliability is considerably low" is high by "3", information indicating that the possibility that "the degree of reliability is slightly low" is high by "2", the information indicating that the possibility that "the degree of reliability is high" is high by "1", and an undetermined state by "0".

The accuracy index associated with the positioning computation result can be used for various purposes within the positioning terminal 10. For example, a terminal having a map display function is capable of displaying the position of the own terminal within a map in the form of color display or icon behavior corresponding to the accuracy index. This allows a user to know what degree of reliability an estimated range of the positioning computation result has.

The accuracy index may also be notified by, for example, the positioning terminal 10 to another device (positioning terminal) via a communication unit (vehicle-to-vehicle communication, mobile communication, W-LAN, or other such communication) in association with the positioning computation result determined through calculation. At this time, the positioning terminal 10 serving as a transmitting device is desired to transmit at least the second positioning accuracy index and the third positioning accuracy index. A receiving device (positioning terminal) is allowed to refer to the assigned accuracy index when performing various kinds of information processing through use of the received positioning computation result to use the accuracy index for assignment of a weighting factor, branching off in an algorithm, execution of predetermined processing, and other such purposes.

For example, in order to support automatic navigation or assisted navigation, a navigation device (device mounted to a vehicle, which includes a communication unit) serving as the positioning terminal 10 may identify the positioning accuracy of positional information on a neighboring device, which is notified of by the neighboring device, from the notified accuracy index, and execute the automatic navigation or the assisted navigation in consideration of the positioning accuracy. As a specific example, in order to support automatic driving, an on-vehicle device serving as the positioning terminal 10 may identify the positioning accuracy of the positional information on another vehicle, which is notified of by the another vehicle, from the notified accuracy index, and perform traveling control so as to maintain a following distance in consideration of the positioning accuracy.

In addition, along with the index of positioning accuracy, information indicating the navigation satellite 20 being a factor of jitter in time may also be notified to another device in association with the positioning computation result via a communication unit. An example of a method of deriving one or more navigation satellites 20 being a factor of jitter in time is described later.

As described above, in a positioning computation process using a continuous navigation signal group, the positioning terminal 10 calculates the magnitude of the jitter in continuity of the clock offset value, the stability, and the change amount of the difference between time differences, which are obtained from the navigation signal group, and derives the index of positioning accuracy of the positioning computation result based on each of the calculated values.

This enables the degree of reliability of the positioning accuracy of the positioning computation result to be provided to the inside and outside of the positioning terminal 10. The degree of reliability of the positioning accuracy is desired to be used in combination with, for example, a positioning error (positioning accuracy limit) of a positioning device or a positioning scheme or an error range of the positioning computation result (position) that can be provided by an existing technology.

Now, some exemplary methods of discriminating the index of positioning accuracy and some examples of using the index of positioning accuracy are described.

In the process of calculating the value of the magnitude of the jitter in continuity of the clock offset value, the stability of a jitter amount in continuity of the clock offset value, and the change amount of the difference between time differences, the positioning terminal 10 calculates a standard deviation value and an average difference between time differences exhibited at the current epoch through use of the clock offset value of the current positioning computation result (obtained at the current epoch) and a reference value determined from a clock offset value group of a past positioning computation result group.

In the process of identifying the value of the magnitude of the jitter in continuity of the clock offset value, the positioning terminal 10 is also allowed to use information indicating whether the clock offset value of the current positioning computation result falls within a predetermined range based on a predetermined threshold value with reference to the average of the clock offset values of a predetermined number of last positioning computation results.

The positioning terminal 10 may also employ a plurality of threshold values or a variable threshold value so as to narrow down the predetermined threshold value in conjunction with the continuity of the clock offset value.

The obtained index can be used by, for example, the positioning terminal 10 being an on-vehicle device when notifying the index to a neighboring vehicle via a vehicle-to-vehicle communication circuit by associating the index with the positioning computation result determined through calculation as the index of positioning accuracy. In addition, in this case, the positioning terminal 10 may notify the information indicating the navigation satellite being a jitter factor in association with the positioning computation result to another vehicle or a management server via a communication unit. In this manner, by being notified to another vehicle or a management server along with the position of the own vehicle, the degree of reliability of the positioning accuracy can be used for supporting automatic driving or for other such purpose.

The positioning terminal 10 may be mounted to an automobile or an autonomous driving vehicle, and may be configured to receive positional information on another vehicle being the positioning computation result obtained by the another vehicle and an index indicating the degree of reliability of the positional information from the another vehicle via vehicle-to-vehicle communication, and to use the index as a discrimination index for the automatic driving of the own vehicle. The positioning terminal 10 may also be configured to transmit positional information on the own vehicle and an index indicating the degree of reliability of the positional information to another vehicle via the vehicle-to-vehicle communication.

The positioning terminal 10 may also be configured to discriminate the navigation satellite being a jitter factor when deterioration of jitter is identified in the continuity of the clock offset value in the positioning computation process using the continuous navigation signal group. The positioning terminal 10 may also have a mechanism for recording a section (coordinate range) in which jitter deterioration has occurred on an electronic map when deterioration of jitter is identified in the continuity of the clock offset value in the positioning computation process using the continuous navigation signal group. It is also useful to share the section in which jitter deterioration has occurred with another device.

By excluding one or more navigation satellites (navigation signals) estimated as a factor of jitter deterioration from the positioning computation, it is possible to obtain position coordinates having higher accuracy. Therefore, when successfully discriminating the navigation satellite being the factor of jitter deterioration, the positioning terminal 10 performs the positioning computation (re-positioning-computation) based on a plurality of navigation signals remaining after a navigation signal from the satellite is excluded. In this case, in parallel with positioning computation processing for obtaining the positioning computation result of the re-positioning-computation, the positioning terminal 10 is operated to calculate the standard deviation value in the continuity of the clock offset value obtained in the positioning computation process and the average difference between time differences from the plurality of navigation signals for the re-positioning-computation, and to determine the positioning accuracy index of the positioning computation result determined through calculation by referring to the standard deviation value and the average difference between time differences. With this operation, both a satisfactory positioning computation result and a satisfactory index to be associated with the positioning computation result can be obtained. For the section in which jitter deterioration has occurred, deterioration in positioning accuracy may be handled by identifying the deterioration in positioning accuracy as required during the next passage. In addition, there may be provided a mechanism for recording the section (coordinate range) in which jitter deterioration has occurred and its estimated direction on an electronic map by associating the section in which jitter deterioration has occurred and a flying direction of one or a plurality of navigation satellites estimated as a factor of jitter deterioration with each other.

Further, the positioning terminal 10 may incorporate a mechanism for comparing a merit of excluding one or a plurality of satellites being a factor of jitter in time with a demerit of excluding the one or plurality of satellites to derive a more satisfactory combination of navigation satellites.

With this mechanism, the number of satellites to be used for the positioning computation is reduced, to thereby pursue, in terms of an algorithm, the elimination of an adverse effect on, for example, the positioning error (positioning accuracy limit) of a positioning scheme or the error range of the positioning computation result (position) that can be provided by an existing technology.

In one example, a dilution-of-precision (DOP) value is used to estimate a combination of navigation satellites that is expected to produce a positioning computation result with higher accuracy.

The positioning terminal 10 may compare the DOP value of a navigation signal group (satellite arrangement) remaining after a navigation signal being a jitter factor is excluded and the DOP value exhibited before the navigation signal being a jitter factor is excluded, and employ a combination having a satisfactory value. The positioning terminal 10 uses a combination of a navigation signal group having a lower DOP value to execute the positioning computation. With this execution, it is possible to extract a navigation signal group expected to be able to obtain a positioning computation result expected to be satisfactory among a large number of navigation signal groups observed for use at one epoch, and continue the positioning computation and the calculation of the accuracy index. As a result, the positioning computation result and the accuracy index that are expected to be more satisfactory can be continuously associated with each other in real time.

The positioning terminal 10 may employ an algorithm of comparing the DOP values for all the combinations of the navigation signal groups. Meanwhile, the positioning terminal 10 may employ an algorithm of comparing the DOP values for the combinations of the remaining navigation signals (satellites) after a navigation signal (satellite) that has caused jitter is estimated in advance by a method other than the observation of the magnitude of the jitter of the clock offset to be excluded. For example, by excluding the navigation signal (satellite) being a large jitter factor at the last several epochs for a given number of epochs, it is possible to produce an effect of reducing computation resources. For example, when the positioning terminal 10 is mounted on a vehicle traveling along a street lined with roadside trees, a navigation signal broadcast from a satellite flying in a lateral direction of its side surface intermittently blocked by trees may be excluded for a predetermined period.

As described above, according to the configuration of this global navigation satellite system, it is possible to provide a satisfactory mechanism for associating the degree of reliability of the positioning computation result based on the navigation signals with the positioning computation result in real time.

Next, a description is given of a configuration example and a processing flow example of the positioning terminal 10 according to this embodiment, which is configured to output the positioning computation result having higher accuracy and the accuracy index in association with each other. Each of the components of the positioning terminal 10 may be achieved by appropriately combining hardware and software.

Figure 3:
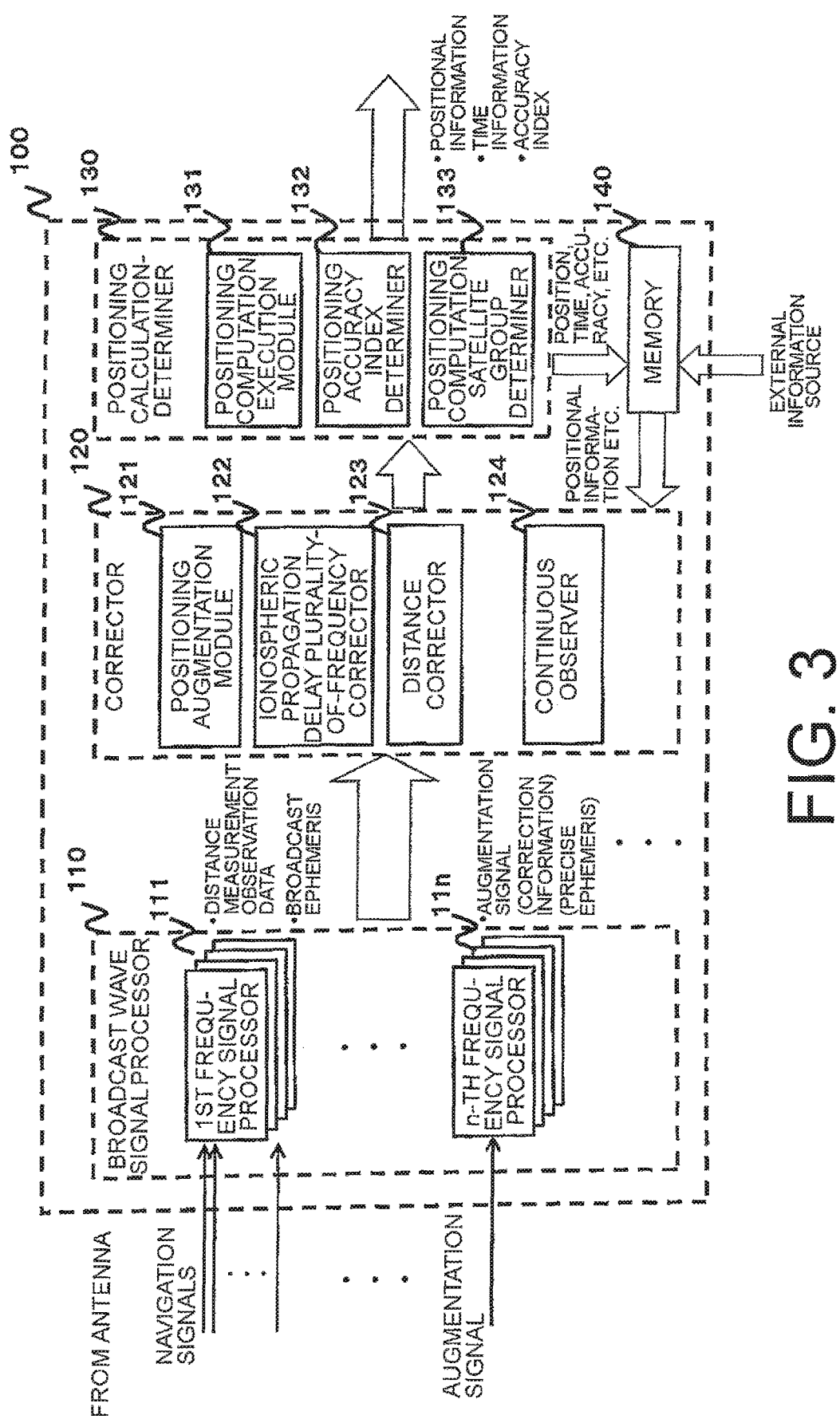
FIG. 3 is a block diagram for illustrating a configuration example of a positioning module in the embodiment.
Figure 4:
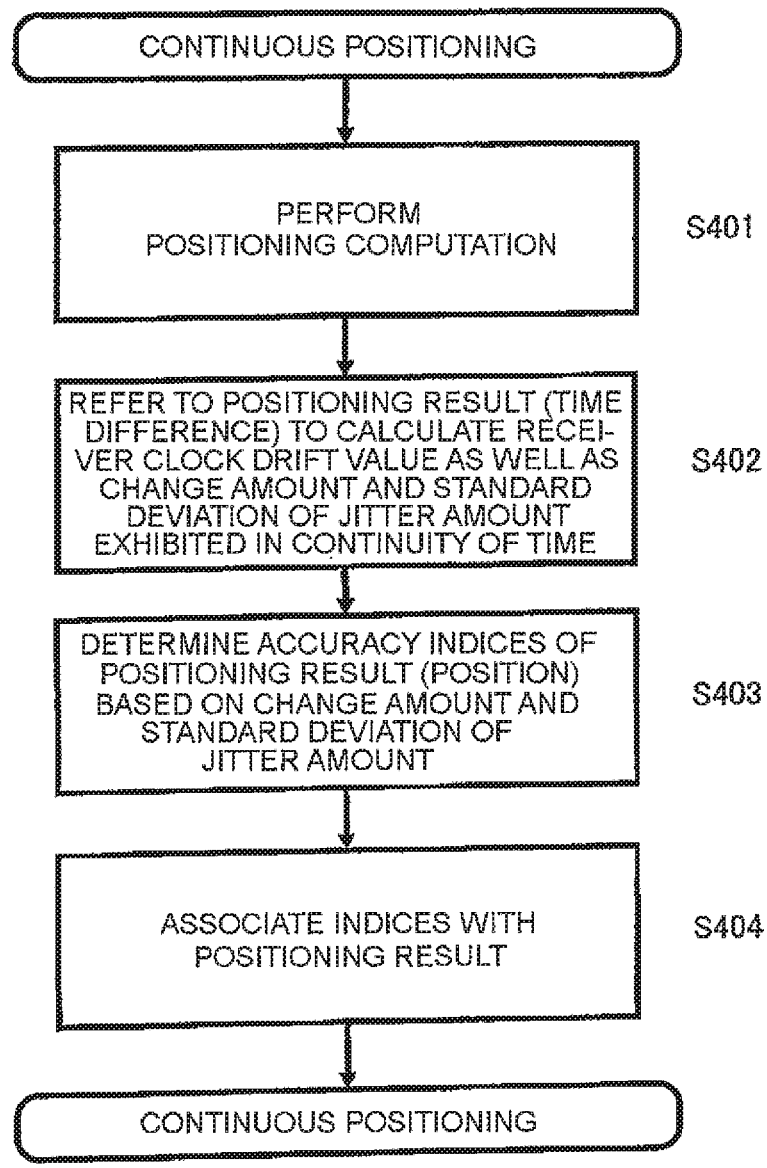
FIG. 4 is a flow chart for illustrating a processing flow example of the positioning terminal according to the embodiment.
Figure 5:
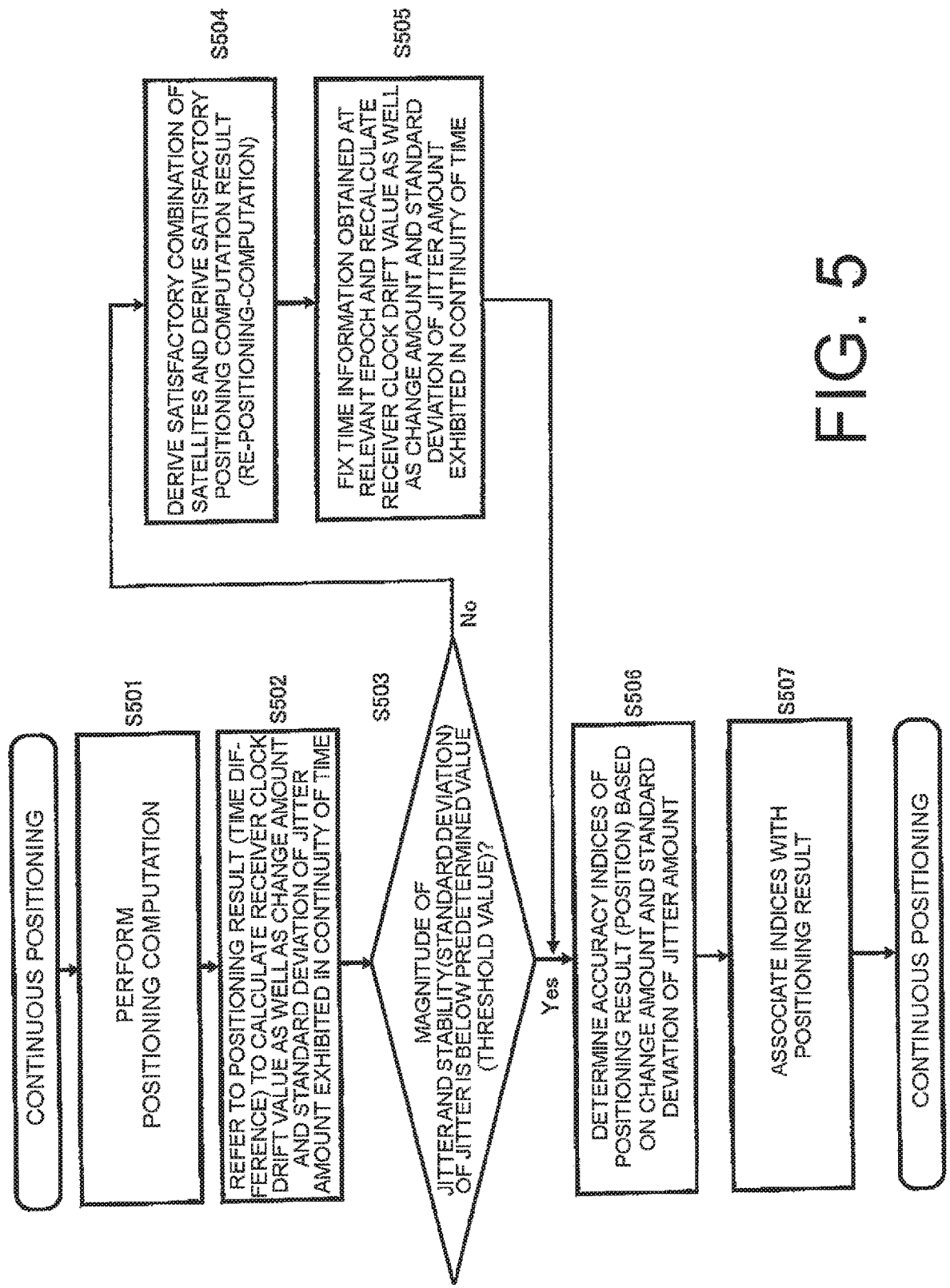
FIG. 5 is a flow chart for illustrating another processing flow example of the positioning terminal according to the embodiment.

FIG. 3 is a block diagram for illustrating a configuration example of the positioning module 100. FIG. 4 and FIG. 5 are each a flow chart for illustrating a processing flow example of the positioning calculation-determiner 130 section.

The broadcast wave signal processor 110 includes a first frequency signal processor 111 to an n-th frequency signal processor 11$n$ (where n represents an integer equal to or larger than 2). With this configuration, the positioning module 100 can simultaneously acquire the navigation signal group having a plurality of waves from a plurality of navigation satellites 20. The positioning module 100 can also receive the augmentation signal from the augmentation satellite to acquire the correction information.

When the positioning module 100 is provided with a simple configuration, the positioning computation can be performed by the single positioning scheme using a pseudorange as long as navigation signals in one frequency band can be received from at least four satellites. Meanwhile, providing channels capable of receiving navigation signals from a larger number of satellites increases the possibility that the positioning computation result having higher accuracy can be obtained. In addition, providing the capability of receiving signals in a plurality of frequency bands enables dual-frequency correction or triple-frequency correction, which leads to an improvement in positioning accuracy. The precise ephemeris and the correction information may be acquired from signals other than the augmentation signal from the augmentation satellite through use of the communication unit of the positioning terminal 10.

The following description is given in consideration of the single positioning scheme using a carrier-phase.

The corrector 120 includes a positioning augmentation module 121, an ionospheric propagation delay plurality-of-frequency corrector 122, and a distance corrector 123. The corrector 120 is configured to receive various kinds of information from the broadcast wave signal processor 110 and others, and to use the correction information and the precise ephemeris to perform correction processing of enhancing the accuracy of positioning that is based on the plurality of navigation signals. The corrector 120 further includes a continuous observer 124 configured to successively determine each value of the error cause through continuous observation.

The positioning augmentation module 121 is configured to identify the correction information that is included in the received augmentation signal and includes the time and orbit of each satellite, the ionosphere, the troposphere, and others, to generate each piece of correction information. Further, it is desired that the positioning augmentation module 121 perform processing operation for securing soundness.

The ionospheric propagation delay plurality-of-frequency corrector 122 is configured to calculate the ionospheric delay component based on a difference in delay among the plurality of navigation signals transmitted from the respective navigation satellites 20 without using the information on the ionosphere, which is included in the augmentation signal, to thereby generate the correction information.

The distance corrector 123 is configured to be capable of using the augmentation signal, the correction information, and the precise ephemeris to correct the distance of ranging observation data. Further, the distance corrector 123 is configured to correct the distance through use of values of information for correction, which are output successively by the continuous observer 124.

The continuous observer 124 determines the respective values of error factors (e.g., ambiguity, tropospheric propagation delay, and clock difference between the positioning terminal and the system time of the navigation satellite) through the continuous observation, and successively outputs the values to the distance corrector 123. With this notification, the distance corrector 123 can obtain distance measurement observation data from which the positioning computation result having higher accuracy can be obtained.

The continuous observer 124 is not required to be provided in the positioning module 100 as illustrated in FIG. 3, and may be provided to any part as long as the continuous observer 124 can access a memory 140 and can determine all or at least one of values convergence of which has been achieved through the continuous observation and successively notify the all or at least one of the values to the distance corrector 123. For example, a microcomputer provided to the outside of the positioning module 100 may perform the above-mentioned operation, or a CPU of a cell phone serving as a positioning terminal, a CPU of an on-vehicle device serving as a positioning terminal, or other such processor may operate as the continuous observer 124.

The positioning calculation-determiner 130 includes a positioning computation execution module 131, a positioning accuracy index determiner 132, and a positioning computation satellite group determiner 133.

The positioning computation execution module 131 is configured to perform the positioning computation on the position and the time of the own terminal based on a plurality of pieces of distance measurement observation data that have been corrected individually. In this description, the positioning computation execution module 131 executes single positioning computation using a carrier-phase at each epoch. In addition, the positioning computation execution module 131 appropriately executes the re-positioning-computation in response to a request. Processing algorithms to be performed by the positioning accuracy index determiner 132 and the positioning computation satellite group determiner 133 may be applied to a scheme using a pseudorange, and are considered to be effective for any positioning scheme that involves obtaining a time offset.

At each epoch, the positioning computation execution module 131 calculates the magnitude of the jitter in continuity of the clock offset value, the stability, and the change amount of the difference between time differences, which are included in the positioning computation result, and the positioning accuracy index determiner 132 determines the indices of positioning accuracy of the positioning computation result determined through calculation based on the respective values.

The positioning computation satellite group determiner 133 discriminates whether to advance to processing for excluding a navigation satellite being a major jitter factor based on the positioning accuracy index determined by the positioning accuracy index determiner 132. In accordance with this discrimination result, the positioning computation satellite group determiner 133 derives a combination of navigation satellites excluding one or a plurality of navigation satellites being a major jitter factor. In the process of this processing, the positioning computation satellite group determiner 133 may involve processing for appropriately causing the positioning computation execution module 131 and the positioning accuracy index determiner 132 to execute positioning computation and accuracy index determination processing with a new combination. The positioning computation execution module 131 and the positioning accuracy index determiner 132 perform the re-positioning-computation processing and re-accuracy-index-determination processing with a combination of navigation satellites expected to be satisfactory, respectively.

The positioning calculation-determiner 130 employs a result of performing the positioning computation through use of a selected satellite group (navigation signal group) as the positional information and the clock offset value exhibited at the relevant epoch, and outputs the result in association with additional accuracy information. At this time, along with the satellite group, the positioning calculation-determiner 130 may output the positional information, the clock offset value, the positioning accuracy index (accuracy information), and the satellite group in association with one another.

The position, time, accuracy, and satellite group obtained by the positioning calculation-determiner 130 are used for necessary purposes (e.g., indication of current time, indication of current position, route search, simple surveying, checking of someone's safety, determination of game events, disaster alert, automated vehicle driving, autonomous robot control, or control of unmanned airplane). Further, the position, time, accuracy, and satellite group are recorded in the memory 140 at any time or at a predetermined timing (e.g., when the positioning is terminated or when the supply of the position and time to an application is stopped).

The memory 140 may not be arranged inside the positioning module 100 as illustrated in FIG. 3, and may be arranged at any position as long as the memory 140 is a storage area that can be accessed by the continuous observer 124. For example, the memory 140 may be arranged inside the corrector 120, or a storage area of the positioning calculation-determiner 130 may be used. Further, a work memory of the positioning terminal 10, a flash ROM, or the like may be used.

The configuration of the positioning calculation-determiner 130 may be other than the configuration example illustrated in FIG. 3. For example, the positioning calculation-determiner 130 may be formed of the positioning computation execution module 131 and the positioning accuracy index determiner 132. In another case, the positioning calculation-determiner 130 may be formed of the positioning computation execution module 131 and the positioning computation satellite group determiner 133. In the case of this configuration, the positioning computation satellite group determiner 133 may include a configuration for identifying by itself the jitter in the continuity of the clock offset value instead of performing the discrimination based on the index of positioning accuracy.

That is, the positioning computation satellite group determiner 133 may be configured to calculate the magnitude of the jitter in continuity of the clock offset value, the stability, and the change amount of the difference between time differences, which are obtained from the plurality of navigation signals, and discriminate a satellite being a major jitter factor based on the respective values and exclude the satellite. For example, this configuration may be employed in a case of presenting the positioning result having satisfactory positioning accuracy and the degree of reliability thereof to the user in real time without outputting the accuracy index to the outside.

Further, the positioning calculation-determiner 130 may delegate a small part or a large part of processing thereof to a microcomputer provided to the outside of the positioning module 100 or a CPU of a cell phone serving as a positioning terminal, a CPU of an on-vehicle device serving as a positioning terminal, or other such processor, and may pursue the accuracy index and the satisfactory positioning accuracy.

FIG. 4 and FIG. 5 are each the flow chart for illustrating the processing flow example of the positioning terminal 10 according to the embodiment. The flow chart is executed by a computation resource serving as the positioning calculation-determiner 130.

In the processing flow example of the positioning terminal 10 illustrated in FIG. 4, the positioning terminal 10 first performs positioning computation based on the navigation signals, the augmentation signal, and other such information that have been received (S401). As a result, when the relevant epoch is set as the epoch i, a receiver antenna position ($Pr_i$) at the epoch i and a receiver clock offset ($dTr_i$) are obtained.

Before fixing the positioning computation result (coordinates and time at the relevant epoch), the positioning terminal 10 refers to the positioning computation result to calculate iii) the magnitude and i) the standard deviation and ii) change amount of difference between time differences of the jitter amount exhibited in the continuity of time (S402). For example, when the relevant epoch is set as the epoch i, a receiver clock drift $\Delta dTr_i$ can be expressed by Expression (1).

$$\Delta dTr_i = dTr_i - dTr_{i-1} \tag{1}$$

From values in a result of Expression (1), the positioning terminal 10 calculates the average (AVERAGE($\Delta dTr$)) and i) the standard deviation ($\sigma(\Delta dTr)$) of the receiver clock drifts. A continuous stability in time jitter of the positioning result can be expressed by i) ($\sigma(\Delta dTr)$), and a change amount of the time jitter can be expressed by ii) ($\Delta dTr_i$-AVERAGE($\Delta dTr$)).

Subsequently, the positioning terminal 10 determines two accuracy indices of the positioning computation result at the relevant epoch based on the respective values of ii) the change amount and i) the standard deviation of the jitter amount (S403). For example, the positioning accuracy indices for the epoch i in which the continuous stability in time jitter has been reflected can be expressed by Expressions (2) and (3) through use of the speed of light (C).

$$i)(\text{positioning accuracy index(stability)}) = \sigma(\Delta dTr) \times C \quad (\text{unit}: m) \quad (2)$$

$$ii)(\text{positioning accuracy index(change amount)}) = (\Delta dTr_i - \text{AVERAGE}(\Delta dTr)) \times C (\text{unit}: m) \quad (3)$$

After that, the positioning terminal 10 outputs the positional information obtained at the relevant epoch and the two accuracy indices calculated by Expressions (2) and (3) in association with each other (S404). The positioning terminal 10 also outputs the accuracy index of iii) the magnitude of the jitter amount exhibited in the continuity of time together in association therewith as required. In this manner, the positioning terminal 10 calculates index values to be associated with the positioning computation result in parallel with the positioning computation in real time, and associates the positioning computation result and the index values within the terminal in real time.

In the processing flow example of the positioning terminal 10 illustrated in FIG. 5, processing (for higher definition) of from Step S503 to Step S505 is inserted into the flow example illustrated in FIG. 4. In this processing example, the positioning terminal discriminates whether to advance to processing for deriving a combination of navigation satellites excluding one or a plurality of navigation satellites being a jitter factor based on one or both of the value of the magnitude of the jitter in continuity of the clock offset value and the stability, performs the re-positioning-computation based on a plurality of navigation signals that have been transmitted from the navigation satellites excluding one or a plurality of navigation satellites being a jitter factor when a satisfactory combination of navigation satellites excluding one or a plurality of navigation satellites being a jitter factor is derived, calculates the standard deviation value in the continuity of the clock offset value obtained in the positioning computation process and the change amount of the difference between time differences from at least the plurality of navigation signals for the re-positioning-computation in parallel with the positioning computation processing for obtaining the positioning computation result of the re-positioning-computation, determines two positioning accuracy indices of the positioning computation result determined through calculation based on the respective values of the standard deviation value and the change amount of the difference between time differences that have been calculated, and associates the determined two positioning accuracy indices with the positioning computation result determined through calculation.

In this manner, according to this embodiment, it is possible to provide a global navigation satellite system, a positioning terminal, a positioning method, and a program, which involve associating the degree of reliability of a positioning computation result based on navigation signals with the positioning computation result in real time.

Further, according to this embodiment, it is possible to provide a global navigation satellite system, a positioning terminal, a positioning method, and a program, which involve deriving a positioning computation result having satisfactory positioning accuracy.

Figure 6:
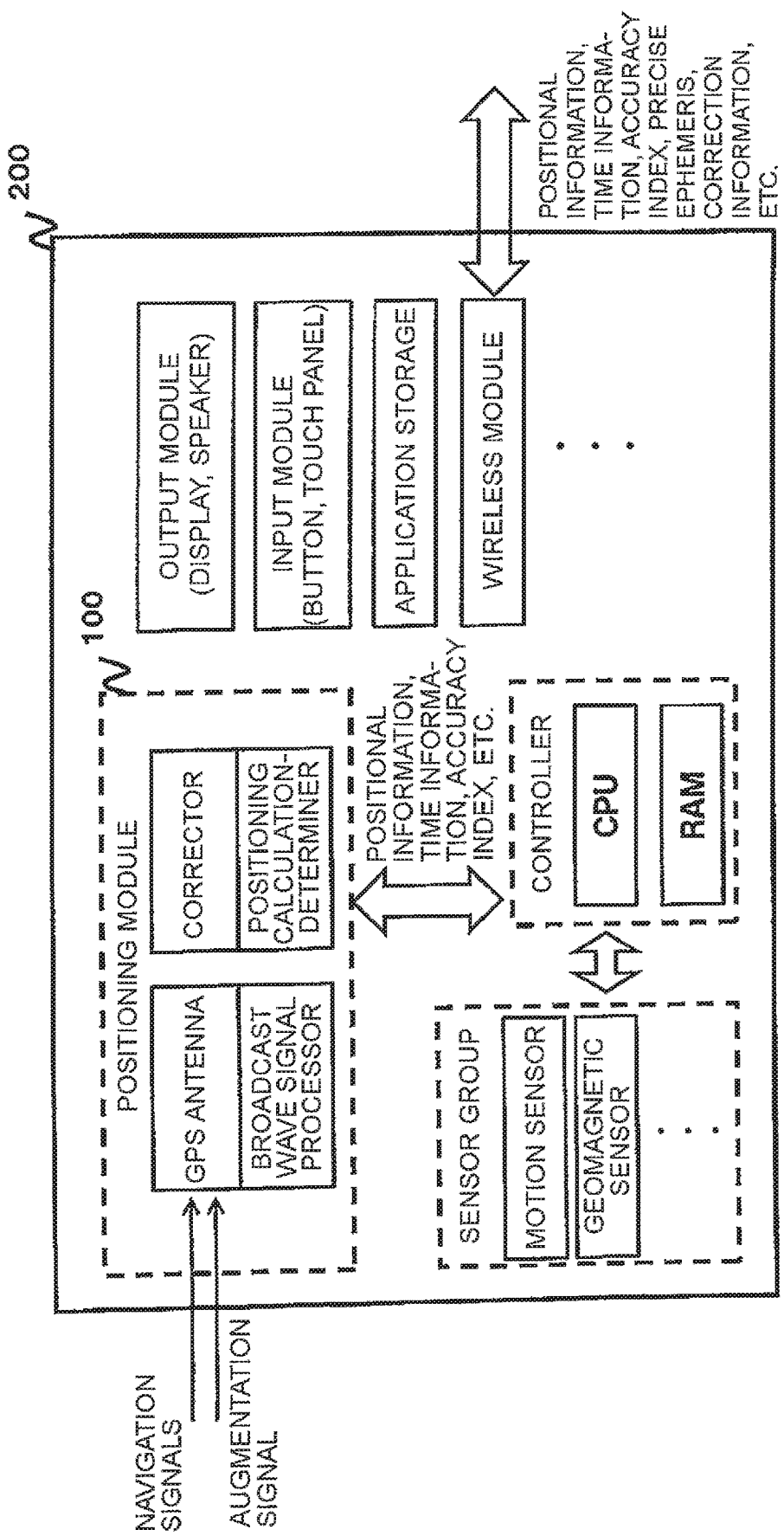
FIG. 6 is a block diagram for illustrating a configuration example of the positioning terminal according to the embodiment.

Components of the positioning terminal may be implemented by a combination of hardware and software. In the mode where the components are a combination of hardware and software, the respective components are implemented as various means by deploying a control program according to this invention in a RAM and causing a microcomputer, a control unit (CPU), and other pieces of hardware to operate as programmed by the program. For example, the positioning terminal may be configured as in FIG. 6. Further, the program may be recorded non-transitorily in a recording medium to be distributed. The program recorded in the recording medium is read onto a memory via cable communication, wireless communication, or the recording medium itself, and runs the controller and others. Examples of the recording medium include optical discs, magnetic disks, semiconductor memory devices, and hard disks.

As described in the description of the above-mentioned embodiment, according to this invention, it is possible to provide a global navigation satellite system, a positioning terminal, a positioning method, and a program, which involve associating the degree of reliability of a positioning computation result based on navigation signals with the positioning computation result in real time.

Further, the specific configuration of this invention is not limited to the embodiment described above, and modifications without departing from the gist of this invention, such as separation and combination of block components and interchange of the procedures, are encompassed within this invention.

Further, part or whole of the above-mentioned embodiments and examples can also be described as follows. The following supplementary notes are not intended to limit this invention.

Supplementary Note 1

A global navigation satellite system, which is configured to:
  a navigation satellite group of navigation satellites each configured to broadcast a navigation signal for GNSS; and
  a positioning terminal configured to perform positioning,
  wherein the positioning terminal is configured to perform processing in parallel while continuously receiving the respective navigation signals from the navigation satellite group and continuously performing positioning computation to obtain a positioning computation result, the processing including:
    using a clock offset value group obtained by the positioning computation to calculate in real time a standard deviation value, which is a value of a standard deviation of a jitter amount of the clock offset value group, and a change amount of a difference between time differences being a difference between clock offset values;
    determining in real time two positioning accuracy indices of the positioning computation result determined through calculation based on respective values of the standard deviation value and the change amount of the difference between time differences that have been calculated;
    associating in real time the determined two positioning accuracy indices with the positioning computation result determined through calculation; and outputting in real time the positioning computation result associated with at least the two positioning accuracy indices.

Supplementary Note 2

The global navigation satellite system according to the above-mentioned supplementary note, wherein the positioning terminal is configured to:
discriminate, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
perform, when a combination of navigation satellites excluding one or plurality of navigation satellites being a jitter factor is derived, re-positioning-computation based on a navigation signal group that has been transmitted from the navigation satellites excluding the one or plurality of navigation satellites being a jitter factor; and
perform processing in parallel while obtaining the positioning computation result of the re-positioning-computation, the processing including:
calculating, from the navigation signal group for the re-positioning-computation, the standard deviation value in the continuity of the clock offset value and the change amount of the difference between time differences that have been obtained in the process of performing the positioning computation;
determining two positioning accuracy indices of the positioning computation result of re-positioning determined through calculation based on the respective values of the standard deviation value and the change amount of the difference between time differences that have been calculated; and
associating the determined two positioning accuracy indices with the positioning computation result of the re-positioning determined through calculation.

Supplementary Note 3

The global navigation satellite system according to the above-mentioned supplementary notes, wherein the positioning terminal is configured to use a value of a difference between a difference between time differences at a most recent epoch and an average difference between time differences as the change amount of the difference between time differences.

Supplementary Note 4

The global navigation satellite system according to the above-mentioned supplementary notes, wherein the positioning terminal is configured to perform the positioning computation based on a Precise Point Positioning scheme, and assign the two positioning accuracy indices to the positioning computation result based on the Precise Point Positioning scheme.

Supplementary Note 5

The global navigation satellite system according to the above-mentioned supplementary notes,
wherein the positioning terminal is mounted to a vehicle including a communication unit, and
wherein the positioning terminal is configured to use the communication unit to notify a communication counterpart device of, together with positional information on the positioning terminal being the positioning computation result, at least one of the two positioning accuracy indices each indicating a degree of reliability of the positional information.

Supplementary Note 6

The global navigation satellite system according to the above-mentioned supplementary notes,
wherein the positioning terminal is mounted to a vehicle including a communication unit, and
wherein the positioning terminal is configured to use the communication unit to receive, together with positional information on a communication counterpart device being the positioning computation result obtained by the communication counterpart device, at least one of the two positioning accuracy indices each indicating a degree of reliability of the positional information from the communication counterpart device, and use the at least one of the two positioning accuracy indices as a discrimination index for automatic driving.

Supplementary Note 7

The global navigation satellite system according to the above-mentioned supplementary notes,
wherein the positioning terminal is mounted to an automobile or an autonomous driving vehicle capable of performing vehicle-to-vehicle communication, and
wherein the positioning terminal is configured to notify another vehicle of, together with positional information on an own vehicle being the positioning computation result, the two positioning accuracy indices each being an index indicating a degree of reliability of the positional information via the vehicle-to-vehicle communication.

Supplementary Note 8

The global navigation satellite system according to the above-mentioned supplementary notes,
wherein the positioning terminal is mounted to an automobile or an autonomous driving vehicle capable of performing vehicle-to-vehicle communication, and
wherein the positioning terminal is configured to receive, together with positional information on another vehicle being the positioning computation result of another vehicle, at least one of the two positioning accuracy indices each indicating a degree of reliability of the positional information from the another vehicle via the vehicle-to-vehicle communication, and use the at least one of the two positioning accuracy indices as a discrimination index for automatic driving of an own vehicle.

Supplementary Note 9

A positioning terminal, comprising a positioning module,
wherein the positioning module is configured to execute processing in parallel while continuously acquiring respective navigation signals from a navigation satellite group of navigation satellites each configured to broadcast a navigation signal for GNSS and continuously performing positioning computation in real time to obtain a positioning computation result, the processing including:

using a clock offset value group obtained by the positioning computation to calculate a standard deviation value, which is a value of a standard deviation of a jitter amount of the clock offset value group, and a change amount of a difference between time differences being a difference between clock offset values;

determining two positioning accuracy indices of the positioning computation result determined through calculation based on respective values of the standard deviation value and the change amount of the difference between time differences that have been calculated; and associating the determined two positioning accuracy indices with the positioning computation result determined through calculation.

Supplementary Note 10

The positioning terminal according to the above-mentioned supplementary note, wherein the positioning module is configured to:

calculate, from clock offset values exhibited at respective epochs, a standard deviation value of difference between time differences at a predetermined number of past epochs that include a clock offset value exhibited at a current epoch;

calculate, from the clock offset values exhibited at the respective epochs, an average difference between time differences value of difference between time differences at a predetermined number of past epochs that do not include the clock offset value exhibited at the current epoch; and associate, as the two positioning accuracy indices, the calculated standard deviation value of the difference between time differences including the clock offset value exhibited at the current epoch and a value of a difference between a difference between time differences at a most recent epoch and an average difference between time differences with the positioning computation result at the current epoch in real time.

Supplementary Note 11

The positioning terminal according to the above-mentioned supplementary notes, wherein the positioning module includes at least:

a broadcast wave signal processor configured to continuously acquire the respective navigation signals from the navigation satellite group of the navigation satellites each configured to broadcast the navigation signal for GNSS; and a positioning calculation-determiner configured to associate the determined two positioning accuracy indices with the positioning computation result determined through calculation to output the two positioning accuracy indices in parallel with the positioning computation for obtaining the positioning computation result, and wherein the positioning calculation-determiner includes:

a positioning computation execution module configured to continuously perform the positioning computation based on a navigation signal group to obtain the positioning computation result; and a positioning accuracy index determiner configured to calculate a standard deviation value of difference between time differences exhibited in the continuity of the clock offset value and a value of a difference between a difference between time differences at a most recent epoch and an average difference between time differences, and determine the two positioning accuracy indices of the positioning computation result determined through calculation based on the respective values of the standard deviation value and the value of a difference between the difference between time differences at the most recent epoch and the average difference between time differences that have been calculated.

Supplementary Note 12

The positioning terminal according to the above-mentioned supplementary notes, wherein the positioning module is configured to:

calculate, in a process of performing the positioning computation at each epoch, a value of a magnitude of jitter of a clock offset value exhibited at a current epoch with respect to clock offset values exhibited at respective epochs;

further determine, based on the calculated value of the magnitude of the jitter of the clock offset value exhibited at the current epoch, a positioning accuracy index of the positioning computation result at the current epoch determined through calculation; and associate the positioning accuracy index with the positioning computation result at the current epoch.

Supplementary Note 13

The positioning terminal according to the above-mentioned supplementary notes, wherein the positioning module is configured to calculate the standard deviation value of the difference between time differences of the clock offset values and the change amount of the difference between time differences by excluding a clock offset value that fails to fall within a threshold value range of a jitter change amount from clock offset values exhibited at a predetermined number of last epochs when a positioning accuracy index for a current epoch is determined through calculation.

Supplementary Note 14

The positioning terminal according to the above-mentioned supplementary notes, wherein the positioning module is configured to process a unit of the two positioning accuracy indices, which are to be assigned to the positioning computation result, into a unit of a distance through use of the speed of light.

Supplementary Note 15

The positioning terminal according to the above-mentioned supplementary notes, wherein the positioning module is configured to perform the positioning computation based on a Precise Point Positioning scheme, and assign the two positioning accuracy indices to the positioning computation result based on the Precise Point Positioning scheme.

Supplementary Note 16

The positioning terminal according to the above-mentioned supplementary notes, wherein the positioning terminal is mounted to a vehicle including a communication unit, and wherein the positioning terminal is configured to use the communication unit to notify a communication counterpart device of, together with positional information on the positioning terminal being the positioning computation result, at least one of the two positioning accuracy indices each indicating a degree of reliability of the positional information.

Supplementary Note 17

The positioning terminal according to the above-mentioned supplementary notes,
wherein the positioning terminal is mounted to a vehicle including a communication unit, and
wherein the positioning terminal is configured to use the communication unit to receive, together with positional information on a communication counterpart device being the positioning computation result obtained by the communication counterpart device, at least one of the two positioning accuracy indices each indicating a degree of reliability of the positional information from the communication counterpart device, and use the at least one of the two positioning accuracy indices as a discrimination index for automatic driving.

Supplementary Note 18

The positioning terminal according to the above-mentioned supplementary notes,
wherein the positioning terminal is mounted to an automobile or an autonomous driving vehicle capable of performing vehicle-to-vehicle communication, and
wherein the positioning terminal is configured to notify another vehicle of, together with positional information on an own vehicle being the positioning computation result, the two positioning accuracy indices each being an index indicating a degree of reliability of the positional information via the vehicle-to-vehicle communication.

Supplementary Note 19

The positioning terminal according to the above-mentioned supplementary notes,
wherein the positioning terminal is mounted to an automobile or an autonomous driving vehicle capable of performing vehicle-to-vehicle communication, and
wherein the positioning terminal is configured to receive, together with positional information on another vehicle being the positioning computation result of another vehicle, at least one of the two positioning accuracy indices each indicating a degree of reliability of the positional information from the another vehicle via the vehicle-to-vehicle communication, and use the at least one of the two positioning accuracy indices as a discrimination index for automatic driving of an own vehicle.

Supplementary Note 20

The positioning terminal according to the above-mentioned supplementary notes, wherein the positioning module is configured to:
discriminate, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
perform, when a combination of navigation satellites excluding one or a plurality of navigation satellites being a jitter factor is derived, re-positioning-computation based on a navigation signal group that has been transmitted from the navigation satellites excluding the one or plurality of navigation satellites being a jitter factor; and
perform processing in parallel while obtaining the positioning computation result of the re-positioning-computation, the processing including:
calculating, from the navigation signal group for the re-positioning-computation, the standard deviation value in the continuity of the clock offset value and the change amount of the difference between time differences that have been obtained in the process of performing the positioning computation;
determining two positioning accuracy indices of the positioning computation result of re-positioning determined through calculation based on the respective values of the standard deviation value and the change amount of the difference between time differences that have been calculated; and
associating the determined two positioning accuracy indices with the positioning computation result of the re-positioning determined through calculation.

Supplementary Note 21

A positioning method, which is to be performed by a positioning terminal of a global navigation satellite system, the positioning method comprising executing, by the positioning terminal, processing in parallel while continuously acquiring respective navigation signals from a navigation satellite group of navigation satellites each configured to broadcast a navigation signal for GNSS and continuously performing positioning computation in real time to obtain a positioning computation result, the processing including:
using a clock offset value group obtained by the positioning computation to calculate a standard deviation value, which is a value of a standard deviation of a jitter amount of the clock offset value group, and a change amount of a difference between time differences being a difference between clock offset values;
determining two positioning accuracy indices of the positioning computation result determined through calculation based on respective values of the standard deviation value and the change amount of the difference between time differences that have been calculated;
associating the determined two positioning accuracy indices with the positioning computation result determined through calculation; and
outputting in real time the positioning computation result associated with at least the two positioning accuracy indices.

Supplementary Note 22

The positioning method according to the above-mentioned supplementary note, further comprising:
discriminating, by the positioning terminal, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
performing, by the positioning terminal, when a combination of navigation satellites excluding one or a plurality of navigation satellites being a jitter factor is derived, re-positioning-computation based on a navigation signal group that has been transmitted from the navigation satellites excluding the one or plurality of navigation satellites being a jitter factor; and performing, by the positioning terminal, processing in parallel while obtaining the positioning computation result of the re-positioning-computation, the processing including:

calculating, from the navigation signal group for the re-positioning-computation, the standard deviation value in the continuity of the clock offset value and the change amount of the difference between time differences that have been obtained in the process of performing the positioning computation;

determining two positioning accuracy indices of the positioning computation result of re-positioning determined through calculation based on the respective values of the standard deviation value and the change amount of the difference between time differences that have been calculated; and associating the determined two positioning accuracy indices with the positioning computation result of the re-positioning determined through calculation.

Supplementary Note 23

The positioning method according to the above-mentioned supplementary notes, further comprising using, by the positioning terminal, a value of a difference between a difference between time differences at a most recent epoch and an average difference between time differences as the change amount of the difference between time differences.

Supplementary Note 24

The positioning method according to the above-mentioned supplementary notes, further comprising:

calculating, by the positioning terminal, from clock offset values exhibited at respective epochs, a standard deviation value of difference between time differences at a predetermined number of past epochs that include a clock offset value exhibited at a current epoch;

calculating, by the positioning terminal, from the clock offset values exhibited at the respective epochs, an average difference between time differences value of difference between time differences at a predetermined number of past epochs that do not include the clock offset value exhibited at the current epoch; and associating, by the positioning terminal, as the two positioning accuracy indices, the calculated standard deviation value of the difference between time differences including the clock offset value exhibited at the current epoch and a value of a difference between a difference between time differences at a most recent epoch and an average difference between time differences with the positioning computation result at the current epoch in real time.

Supplementary Note 25

The positioning method according to the above-mentioned supplementary notes, further comprising:

calculating, by the positioning terminal, in a process of performing the positioning computation at each epoch, a value of a magnitude of jitter of a clock offset value exhibited at a current epoch with respect to clock offset values exhibited at respective epochs;

further determining, by the positioning terminal, based on the calculated value of the magnitude of the jitter of the clock offset value exhibited at the current epoch, a positioning accuracy index of the positioning computation result at the current epoch determined through calculation; and associating, by the positioning terminal, the positioning accuracy index with the positioning computation result at the current epoch.

Supplementary Note 26

The positioning method according to the above-mentioned supplementary notes, further comprising calculating, by the positioning terminal, the standard deviation value of the difference between time differences of the clock offset values and the change amount of the difference between time differences by excluding a clock offset value that fails to fall within a threshold value range of a jitter change amount from clock offset values exhibited at a predetermined number of last epochs when a positioning accuracy index for a current epoch is determined through calculation.

Supplementary Note 27

The positioning method according to the above-mentioned supplementary notes, further comprising processing, by the positioning terminal, a unit of the two positioning accuracy indices, which are to be assigned to the positioning computation result, into a unit of a distance through use of the speed of light.

Supplementary Note 28

The positioning method according to the above-mentioned supplementary notes, further comprising performing, by the positioning terminal, the positioning computation based on a Precise Point Positioning scheme, and assigning the two positioning accuracy indices to the positioning computation result based on the Precise Point Positioning scheme.

Supplementary Note 29

The positioning method according to the above-mentioned supplementary notes, wherein the positioning terminal is mounted to a vehicle including a communication unit, and wherein the positioning method further comprises using, by the positioning terminal, the communication unit to notify a communication counterpart device of, together with positional information on the positioning terminal being the positioning computation result, at least one of the two positioning accuracy indices each indicating a degree of reliability of the positional information.

Supplementary Note 30

The positioning method according to the above-mentioned supplementary notes, wherein the positioning terminal is mounted to a vehicle including a communication unit, and wherein the positioning method further comprises using, by the positioning terminal, the communication unit to receive, together with positional information on a communication counterpart device being the positioning computation result obtained by the communication counterpart device, at least one of the two positioning accuracy indices each indicating a degree of reliability of the positional information from the communication counterpart device, and using the at least one of the two positioning accuracy indices as a discrimination index for automatic driving.

Supplementary Note 31

The positioning method according to the above-mentioned supplementary notes,
wherein the positioning terminal is mounted to an automobile or an autonomous driving vehicle capable of performing vehicle-to-vehicle communication, and
wherein the positioning method further comprises notifying, by the positioning terminal, another vehicle of, together with positional information on an own vehicle being the positioning computation result, the two positioning accuracy indices each being an index indicating a degree of reliability of the positional information.

Supplementary Note 32

The positioning method according to the above-mentioned supplementary notes,
wherein the positioning terminal is mounted to an automobile or an autonomous driving vehicle capable of performing vehicle-to-vehicle communication, and
wherein the positioning method further comprises receiving, by the positioning terminal, together with positional information on another vehicle being the positioning computation result of another vehicle, at least one of the two positioning accuracy indices each indicating a degree of reliability of the positional information from the another vehicle via the vehicle-to-vehicle communication, and using the at least one of the two positioning accuracy indices as a discrimination index for automatic driving of an own vehicle.

Supplementary Note 33

A program for positioning, for causing a positioning terminal to be operated to execute processing in parallel while continuously acquiring respective navigation signals from a navigation satellite group of navigation satellites each configured to broadcast a navigation signal for GNSS and continuously performing positioning computation in real time to obtain a positioning computation result, the processing including:
using a clock offset value group obtained by the positioning computation to calculate a standard deviation value, which is a value of a standard deviation of a jitter amount of the clock offset value group, and a change amount of a difference between time differences being a difference between clock offset values;
discriminating two positioning accuracy indices of the positioning computation result determined through calculation based on respective values of the standard deviation value and the change amount of the difference between time differences that have been calculated;
associating the determined two positioning accuracy indices with the positioning computation result determined through calculation; and
outputting in real time the positioning computation result associated with at least the two positioning accuracy indices.

Supplementary Note 34

The program for positioning according to the above-mentioned supplementary note, wherein the program is configured to cause the positioning terminal to be operated to:
discriminate, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
perform, when a combination of navigation satellites excluding one or a plurality of navigation satellites being a jitter factor is derived, re-positioning-computation based on a navigation signal group that has been transmitted from the navigation satellites excluding the one or plurality of navigation satellites being a jitter factor; and
perform processing in parallel while obtaining the positioning computation result of the re-positioning-computation, the processing including:
calculating, from the navigation signal group for the re-positioning-computation, the standard deviation value in the continuity of the clock offset value and the change amount of the difference between time differences that have been obtained in the process of performing the positioning computation;
discriminating two positioning accuracy indices of the positioning computation result of re-positioning determined through calculation based on the respective values of the standard deviation value and the change amount of the difference between time differences that have been calculated; and
associating the determined two positioning accuracy indices with the positioning computation result of the re-positioning determined through calculation.

Supplementary Note 35

The program for positioning according to the above-mentioned supplementary notes, wherein the program is configured to cause the positioning terminal to be operated to use a value of a difference between a difference between time differences at a most recent epoch and an average difference between time differences as the change amount of the difference between time differences.

Supplementary Note 36

The program for positioning according to the above-mentioned supplementary notes, wherein the program is configured to cause the positioning terminal to be operated to:
calculate, from clock offset values exhibited at respective epochs, a standard deviation value of difference between time differences at a predetermined number of past epochs that include a clock offset value exhibited at a current epoch;
calculate, from the clock offset values exhibited at the respective epochs, an average difference between time differences value of difference between time differences at a predetermined number of past epochs that do not include the clock offset value exhibited at the current epoch; and
associate, as the two positioning accuracy indices, the calculated standard deviation value of the difference between time differences including the clock offset value exhibited at the current epoch and a value of a difference between a difference between time differences at a most recent epoch and an average difference between time differences with the positioning computation result at the current epoch in real time.

Supplementary Note 37

The program for positioning according to the above-mentioned supplementary notes, wherein the program is configured to cause the positioning terminal to be operated to:

calculate, in a process of performing the positioning computation at each epoch, a value of a magnitude of jitter of a clock offset value exhibited at a current epoch with respect to clock offset values exhibited at respective epochs;

further determine, based on the calculated value of the magnitude of the jitter of the clock offset value exhibited at the current epoch, a positioning accuracy index of the positioning computation result at the current epoch determined through calculation; and associate the positioning accuracy index with the positioning computation result at the current epoch.

Supplementary Note 38

The program for positioning according to the above-mentioned supplementary notes, wherein the program is configured to cause the positioning terminal to be operated to calculate the standard deviation value of the difference between time differences of the clock offset values and the change amount of the difference between time differences by excluding a clock offset value that fails to fall within a threshold value range of a jitter change amount from clock offset values exhibited at a predetermined number of last epochs when a positioning accuracy index for a current epoch is determined through calculation.

Supplementary Note 39

The program for positioning according to the above-mentioned supplementary notes, wherein the program is configured to cause the positioning terminal to be operated to process a unit of the two positioning accuracy indices, which are to be assigned to the positioning computation result, into a unit of a distance through use of the speed of light.

Supplementary Note 40

The program for positioning according to the above-mentioned supplementary notes, wherein the program is configured to cause the positioning terminal to be operated to perform the positioning computation based on a Precise Point Positioning scheme, and assign the two positioning accuracy indices to the positioning computation result based on the Precise Point Positioning scheme.

Supplementary Note 41

The program for positioning according to the above-mentioned supplementary notes, wherein the program is configured to cause the positioning terminal, which is mounted to a vehicle including a communication unit, to be operated to use the communication unit to notify a communication counterpart device of, together with positional information on itself being the positioning computation result, at least one of the two positioning accuracy indices each indicating a degree of reliability of the positional information.

Supplementary Note 42

The program for positioning according to the above-mentioned supplementary notes, wherein the program is configured to cause the positioning terminal, which is mounted to a vehicle including a communication unit, to be operated to use the communication unit to receive, together with positional information on a communication counterpart device being the positioning computation result obtained by the communication counterpart device, at least one of the two positioning accuracy indices each indicating a degree of reliability of the positional information, and use the at least one of the two positioning accuracy indices as a discrimination index for automatic driving.

Supplementary Note 43

The program for positioning according to the above-mentioned supplementary notes, wherein the program is configured to cause the positioning terminal, which is mounted to an automobile or an autonomous driving vehicle capable of performing vehicle-to-vehicle communication, to be operated to notify another vehicle of, together with positional information on an own vehicle being the positioning computation result, the two positioning accuracy indices each being an index indicating a degree of reliability of the positional information via the vehicle-to-vehicle communication.

Supplementary Note 44

The program for positioning according to the above-mentioned supplementary notes, wherein the program is configured to cause the positioning terminal, which is mounted to an automobile or an autonomous driving vehicle capable of performing vehicle-to-vehicle communication, to be operated to receive, together with positional information on another vehicle being the positioning computation result of another vehicle, at least one of the two positioning accuracy indices each indicating a degree of reliability of the positional information from the another vehicle via the vehicle-to-vehicle communication, and use the at least one of the two positioning accuracy indices as a discrimination index for automatic driving of an own vehicle.

Supplementary Note 45

A computer-readable recording medium having the program for positioning of above-mentioned supplementary notes recorded thereon non-transitorily.

According to this invention, it is possible to recognize the degree of reliability of the positioning accuracy of a global navigation satellite system, and to also use a satisfactory accuracy index in the inside or outside of the positioning terminal. The use of this method produces an effect useful for many different services provided by the own and other terminals. Examples of the services include a navigation service, a current position display service, a tracking service, a security service, a video game service, and a service combining those services. In those services, there is a demand for the positional information having higher accuracy, and it is also possible to effectively use the degree of reliability. According to this method, by combining this method with another effective correction method, it is possible to assign an accuracy index exhibiting mm-order accuracy to a positioning result of single positioning exhibiting cm-order accuracy in real time, which can be used for various services.

This application claims priority from Japanese Patent Application No. 2016-059554, filed on Mar. 24, 2016, the disclosure of which is incorporated herein in its entirety by reference.

EXPLANATION OF REFERENCE SIGNS 10 positioning terminal
20 navigation satellite
100 positioning module
110 broadcast wave signal processor
111 first frequency signal processor
11n n-th frequency signal processor
120 corrector
121 positioning augmentation module
122 ionospheric propagation delay plurality-of-frequency corrector
123 distance corrector
124 continuous observer
130 positioning calculation-determiner
131 positioning computation execution module
132 positioning accuracy index determiner
133 positioning computation satellite group determiner
140 memory

What is claimed is:

1. A positioning terminal, comprising a Global Navigation Satellite System (GNSS) receiver,
wherein the GNSS receiver is configured to execute processing in parallel while continuously acquiring respective navigation signals from navigation satellites, each navigation satellite configured to broadcast a navigation signal for GNSS and continuously performing positioning computation in real time to obtain a positioning computation result, the processing including:
i) calculating a standard deviation value of a clock offset value exhibited at a current epoch based on each clock offset value obtained by the positioning computation of each epoch, which is a value of a jitter amount of the each clock offset value;
ii) calculating a change amount of a most recent difference between time differences based on each value of difference between time differences of each epoch, which is the each value of difference between time differences that is a difference between each current clock offset value and a clock offset value immediately preceding the current clock offset value;
determining two positioning accuracy indices of the current epoch based on respective values of the standard deviation value of the clock offset value exhibited at the current epoch and the change amount of the most recent difference between the time differences; and
associating the two positioning accuracy indices with the positioning computation result of the current epoch.

2. The positioning terminal according to claim 1, wherein the GNSS receiver is configured to:
calculate, from clock offset values exhibited at respective epochs, the standard deviation value of difference between time differences at the current epoch and a predetermined number of past epochs;
calculate, from the clock offset values exhibited at the respective epochs, an average value of difference between time differences at a predetermined number of past epochs that do not include the clock offset value exhibited at the current epoch; and
associate, as the two positioning accuracy indices, i) the calculated standard deviation value and ii) a value of the difference between time differences at the current epoch and the average as the change amount of the positioning computation result at the current epoch in real time.

3. The positioning terminal according to claim 1, wherein the GNSS receiver positioning module includes at least:
a broadcast wave signal processor configured to continuously acquire the respective navigation signals from the navigation satellites each configured to broadcast the navigation signal for GNSS; and
a processor configured to associate the determined two positioning accuracy indices with the positioning computation result.

4. The positioning terminal according to claim 1, wherein the GNSS receiver is configured to:
calculate, in a process of performing the positioning computation at each epoch, a value of a magnitude of jitter of the clock offset value exhibited at the current epoch with respect to clock offset values exhibited at respective epochs;
further determine, based on the calculated value of the magnitude of the jitter of the clock offset value exhibited at the current epoch, iii) a positioning accuracy index of the positioning computation result at the current epoch; and
associate the positioning accuracy index with the positioning computation result at the current epoch.

5. The positioning terminal according to claim 1, wherein the GNSS receiver is configured to calculate the standard deviation value and the change amount by excluding a clock offset value that fails to fall within a threshold value range of a jitter change amount from clock offset values exhibited at a predetermined number of last epochs when the two positioning accuracy indices for the current epoch is determined through calculation.

6. The positioning terminal according to claim 1, wherein the GNSS receiver is configured to process a unit of the two positioning accuracy indices, which are to be assigned to the positioning computation result, into a unit of a distance through use of the speed of light.

7. The positioning terminal according to claim 1, wherein the GNSS receiver is configured to perform the positioning computation based on a Precise Point Positioning scheme, and assign the two positioning accuracy indices to the positioning computation result based on the Precise Point Positioning scheme.

8. The positioning terminal according to claim 1,
wherein the positioning terminal is mounted to a vehicle including a communication unit, and
wherein the positioning terminal is configured to use the communication unit to notify a communication counterpart device of, together with positional information on the positioning terminal being the positioning computation result, at least one of the two positioning accuracy indices each indicating a degree of reliability of the positional information.

9. The positioning terminal according to claim 1,
wherein the positioning terminal is mounted to a vehicle including a communication unit, and
wherein the positioning terminal is configured to use the communication unit to receive, together with positional information on a communication counterpart device being the positioning computation result obtained by the communication counterpart device, at least one of the two positioning accuracy indices each indicating a degree of reliability of the positional information from the communication counterpart device, and use the at least one of the two positioning accuracy indices as a discrimination index for automatic driving.

10. The positioning terminal according to claim 1,
wherein the positioning terminal is mounted to an automobile or an autonomous driving vehicle capable of performing vehicle-to-vehicle communication, and
wherein the positioning terminal is configured to notify another vehicle of, together with positional information on an own vehicle being the positioning computation result, the two positioning accuracy indices each being an index indicating a degree of reliability of the positional information via the vehicle-to-vehicle communication.

11. The positioning terminal according to claim 1,
wherein the positioning terminal is mounted to an automobile or an autonomous driving vehicle capable of performing vehicle-to-vehicle communication, and
wherein the positioning terminal is configured to receive, together with positional information on another vehicle being the positioning computation result of another vehicle, at least one of the two positioning accuracy indices each indicating a degree of reliability of the positional information from the another vehicle via the vehicle-to-vehicle communication, and use the at least one of the two positioning accuracy indices as a discrimination index for automatic driving of an own vehicle.

12. The positioning terminal according to claim 1, wherein the GNSS receiver is configured to:
determine, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
perform, when a combination of navigation satellites excluding one or a plurality of navigation satellites being a jitter factor is derived, re-positioning-computation based on a navigation signal group that has been transmitted from the navigation satellites excluding the one or plurality of navigation satellites being a jitter factor; and
perform processing in parallel while obtaining the positioning computation result of the re-positioning-computation, the processing including:
  calculating, from the navigation signal group for the re-positioning-computation, the standard deviation value;
  determining two positioning accuracy indices of the positioning computation result of re-positioning-computation based on the respective values of the standard deviation value and the change amount; and
  associating the determined two positioning accuracy indices with the positioning computation result of the re-positioning-computation.

13. A positioning method, performed by a positioning terminal of a global navigation satellite system,
the positioning method comprising executing, by the positioning terminal, processing in parallel while continuously acquiring respective navigation signals from navigation satellites, each navigation satellite configured to broadcast a navigation signal for GNSS and continuously performing positioning computation in real time to obtain a positioning computation result, the processing including:

i) calculating a standard deviation value of a clock offset value exhibited at a current epoch based on each clock offset value obtained by the positioning computation of each epoch, which is a value of a jitter amount of the each clock offset value;
ii) calculating a change amount of a most recent difference between time differences based on each value of difference between time differences of each epoch, which is the each value of difference between time differences that is a difference between each current clock offset value and a clock offset value immediately preceding the current clock offset value;
determining two positioning accuracy indices of the current epoch based on respective values of the standard deviation value of the clock offset value exhibited at the current epoch and the change amount of the most recent difference between the time differences;
associating the two positioning accuracy indices with the positioning computation result of the current epoch; and
outputting in real time the positioning computation result associated with at least the two positioning accuracy indices.

14. The positioning method according to claim 13, further comprising:
determining, by the positioning terminal, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
performing, by the positioning terminal, when a combination of navigation satellites excluding one or a plurality of navigation satellites being a jitter factor is derived, re-positioning-computation based on a navigation signal group that has been transmitted from the navigation satellites excluding the one or plurality of navigation satellites being a jitter factor; and
performing, by the positioning terminal, processing in parallel while obtaining the positioning computation result of the re-positioning-computation, the processing including:
  calculating, from the navigation signal group for the re-positioning-computation, the standard deviation value;
  determining two positioning accuracy indices of the positioning computation result of re-positioning-computation based on the respective values of the standard deviation value and the change amount; and
  associating the determined two positioning accuracy indices with the positioning computation result of the re-positioning-computation.

15. The positioning method according to claim 13,
wherein the positioning terminal is mounted to an automobile or an autonomous driving vehicle capable of performing vehicle-to-vehicle communication, and
wherein the positioning method further comprises notifying, by the positioning terminal, another vehicle of, together with positional information on an own vehicle being the positioning computation result, the two positioning accuracy indices each being an index indicating a degree of reliability of the positional information.

16. The positioning method according to claim 13,
wherein the positioning terminal is mounted to an automobile or an autonomous driving vehicle capable of performing vehicle-to-vehicle communication, and
wherein the positioning method further comprises receiving, by the positioning terminal, together with positional information on another vehicle being the positioning computation result of another vehicle, at least one of the two positioning accuracy indices each indicating a degree of reliability of the positional information from the another vehicle via the vehicle-to-vehicle communication, and using the at least one of the two positioning accuracy indices as a discrimination index for automatic driving of an own vehicle.

17. A non-transitory computer-readable recording medium having a program recorded thereon, the program for positioning, for causing a processor of a positioning terminal to be operated to execute processing in parallel while continuously acquiring respective navigation signals from navigation satellites, each navigation satellite configured to broadcast a navigation signal for GNSS and continuously performing positioning computation in real time to obtain a positioning computation result, the processing including:
  i) calculating a standard deviation value of a clock offset value exhibited at a current epoch based on each clock offset value obtained by the positioning computation of each epoch, which is a value of a jitter amount of the each clock offset value;
  ii) calculating a change amount of a most recent difference between time based on each value of difference between time differences of each epoch, which is the each value of difference between time differences that is a difference between each current clock offset value and a clock offset value immediately preceding the current clock offset value;
  determining two positioning accuracy indices of the current epoch based on respective values of the standard deviation value of the clock offset value exhibited at the current epoch and the change amount of the most recent difference between the time differences;
  associating the two positioning accuracy indices with the positioning computation result of the current epoch; and
  outputting in real time the positioning computation result associated with at least the two positioning accuracy indices.

18. The non-transitory computer-readable recording medium according to claim 17, wherein the program is configured to cause the processor of the positioning terminal to be operated to:
  determine, in a process of performing the positioning computation at each epoch, whether to advance to processing for deriving a combination of navigation satellites excluding one or a plurality of navigation satellites being a jitter factor based on one or both of a magnitude of jitter in continuity of the clock offset value and a stability thereof;
  perform, when a combination of navigation satellites excluding one or a plurality of navigation satellites being a jitter factor is derived, re-positioning-computation based on a navigation signal group that has been transmitted from the navigation satellites excluding the one or plurality of navigation satellites being a jitter factor; and
  perform processing in parallel while obtaining the positioning computation result of the re-positioning-computation, the processing including:
    calculating, from the navigation signal group for the re-positioning-computation, the standard deviation value;
    determining two positioning accuracy indices of the positioning computation result of re-positioning-computation based on the respective values of the standard deviation value and the change amount; and
    associating the determined two positioning accuracy indices with the positioning computation result of the re-positioning-computation.

19. The non-transitory computer-readable recording medium according to claim 17, wherein the program is configured to cause the positioning terminal, which is mounted to an automobile or an autonomous driving vehicle capable of performing vehicle-to-vehicle communication, to be operated to notify another vehicle of, together with positional information on an own vehicle being the positioning computation result, the two positioning accuracy indices each being an index indicating a degree of reliability of the positional information via the vehicle-to-vehicle communication.

20. The non-transitory computer-readable recording medium according to claim 17, wherein the program is configured to cause the positioning terminal, which is mounted to an automobile or an autonomous driving vehicle capable of performing vehicle-to-vehicle communication, to be operated to receive, together with positional information on another vehicle being the positioning computation result of another vehicle, at least one of the two positioning accuracy indices each indicating a degree of reliability of the positional information from the another vehicle via the vehicle-to-vehicle communication, and use the at least one of the two positioning accuracy indices as a discrimination index for automatic driving of an own vehicle.

* * * * *